United States Patent
Neufeld

(10) Patent No.: US 6,278,703 B1
(45) Date of Patent: Aug. 21, 2001

(54) METHOD AND APPARATUS FOR IMPROVING NEIGHBOR SEARCHING PERFORMANCE

(75) Inventor: Arthur James Neufeld, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/457,095

(22) Filed: Dec. 7, 1999

Related U.S. Application Data

(60) Provisional application No. 60/111,765, filed on Dec. 9, 1998.

(51) Int. Cl.[7] .............................. H04B 7/216; H04B 7/212
(52) U.S. Cl. ............................................. 370/342; 370/337
(58) Field of Search ..................................... 370/320, 324, 370/329, 333, 334, 335, 336, 341, 342, 343, 345, 337; 455/437, 572, 574, 525

(56) References Cited

U.S. PATENT DOCUMENTS

| | | |
|---|---|---|
| 5,392,287 | 2/1995 | Tiedemann, Jr. et al. . |
| 5,577,022 | 11/1996 | Padovani et al. . |
| 5,627,835 | 5/1997 | Witter . |
| 5,953,320 * | 9/1999 | Williamson et al. ................ 370/252 |
| 6,078,611 * | 6/2000 | La Rosa et al. ..................... 375/206 |

FOREIGN PATENT DOCUMENTS

| | | |
|---|---|---|
| 2317077 | 3/1998 | (GB) . |
| 2318952 | 5/1998 | (GB) . |
| 2320654 | 6/1998 | (GB) . |
| 9802758 | 1/1998 | (WO) . |

* cited by examiner

*Primary Examiner*—Wellington Chin
*Assistant Examiner*—Brenda H. Pham
(74) *Attorney, Agent, or Firm*—Philip Wadsworth; Charles D. Brown; Raymond Hom

(57) ABSTRACT

In a system for mobile wireless communication, it is desirable to minimize the period of time during which the RF circuitry is powered (i.e. the RF power period). A novel method and apparatus for pilot monitoring during standby mode defers processing of pilot search results until the RF power period has passed. This approach allows more searches to be performed without extending the RF power period, thus improving idle handoff performance without reducing battery charge life.

28 Claims, 9 Drawing Sheets

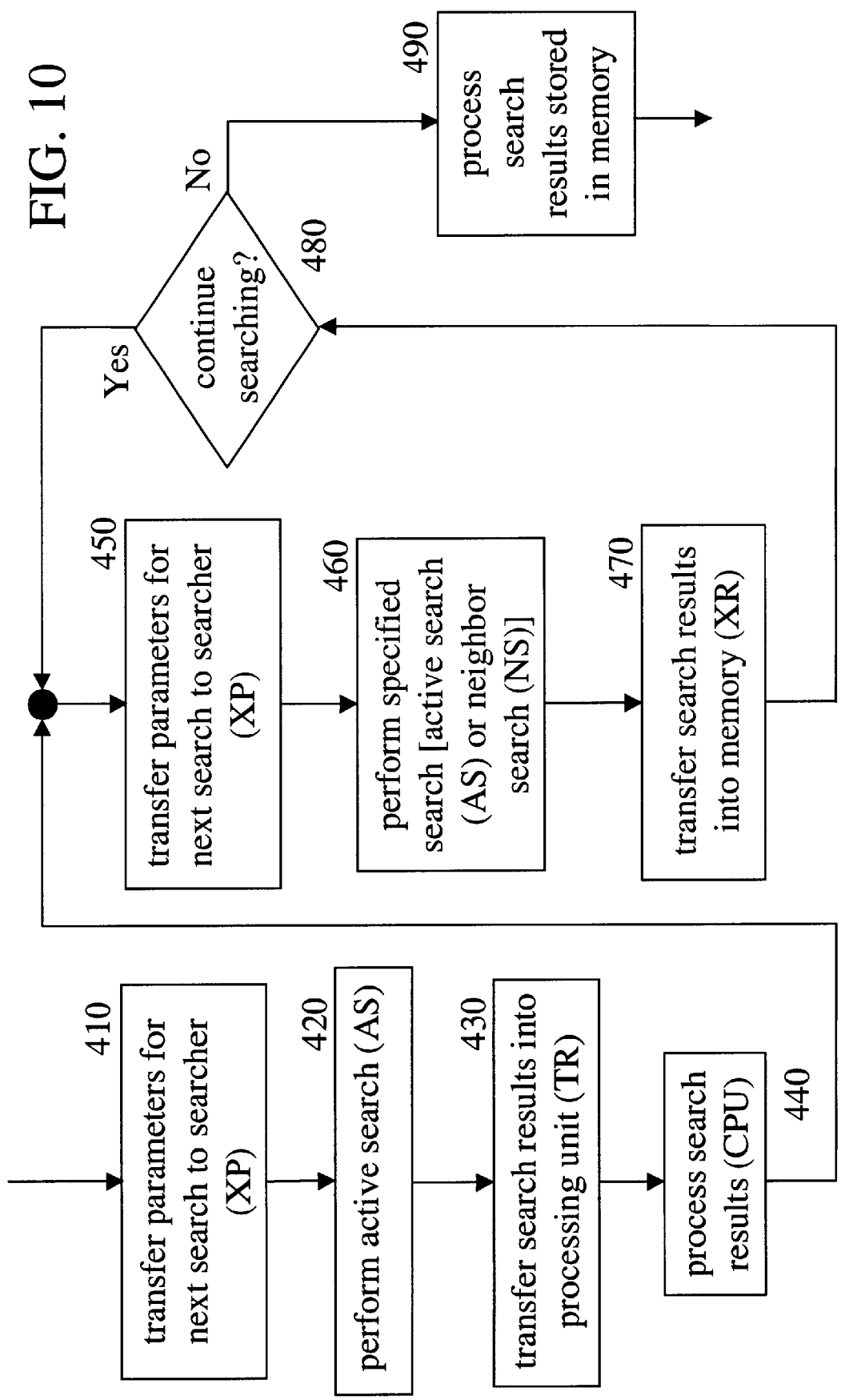

METHOD AND APPARATUS FOR IMPROVING NEIGHBOR SEARCHING PERFORMANCE

This application is a PRO of No. 60/111,765 Dec. 9, 1998.

BACKGROUND OF THE INVENTION

1. Field of the Invention

This invention relates to wireless communications. More specifically, this invention relates to pilot-assisted digital wireless communications.

2. Description of Related Art and General Background

Call and Standby Modes

Wireless mobile communications involves communications between mobile units and/or between a mobile unit and a base unit. Mobile units typically operate in one of two principal modes. In call mode, the mobile unit is actively engaged in a communication with another unit. In standby mode, the mobile unit is not in use but is ready to receive incoming calls. Although a mobile unit in standby mode is usually not transmitting, it must still remain sufficiently active to detect and respond to signals that are directed to it, such as notifications of incoming calls.

It is desirable to reduce power consumption by the mobile units, thereby enabling them to operate for longer periods between battery replacement or recharging. One method of reducing power consumption is to interrupt the supply of power to circuits in the mobile unit that are not currently in use. Because a mobile unit in standby mode is not being used, for example, it would normally be advantageous to power down the display circuitry until a display is needed again.

Slotted Paging

In a typical wireless telephone application, the mobile unit receives information about incoming calls by monitoring a paging channel, which is a one-way link for communications from the base unit to the mobile units. When the base unit receives notice of a call destined for a particular mobile unit, it pages the mobile unit by broadcasting a paging signal over the paging channel. Included in the paging signal is an identifier associated with the mobile unit. When the mobile unit receives the paging signal and recognizes the identifier, it responds to the base unit in an appropriate manner on another channel (commonly called an access channel or access request channel) and the connection is initiated.

It has been recognized that a considerable portion of the power consumed by a mobile unit in standby mode is due to the RF circuitry, which receives the radio signal and outputs a data signal at baseband. Power consumption may be greatly reduced, and the time between battery recharges for a mobile unit in standby mode may therefore be significantly extended, by implementing discontinuous reception on the paging channel (a technique which is also called 'slotted paging'). In one version of slotted paging, time is divided into consecutive slots of equal duration which are numbered in chronological order from 1 to N (where N is a counting number, and the slot numbering is restarted at 1 after N is reached). At least one slot number is assigned to each mobile unit, and the base unit is constrained to broadcast a paging signal to any particular mobile unit only during a slot whose number has been assigned to that mobile unit. As the mobile unit's RF circuitry may be powered down (i.e. the RF circuitry may be in an unpowered state) during most of the other slots, a significant power savings is thereby achieved.

In a slotted paging system, it is usually desirable to power up the RF circuitry at some moment prior to the start of an assigned paging slot, thus giving the circuitry a chance to stabilize by the time it is required to receive and output signals. This power-up moment is indicated in the timeline of FIG. 1 as point A.

In order for the receiver to receive valid symbols, it may be necessary to perform additional procedures once the RF circuitry has become stable. In a CDMA system, for example, acquisition of at least one (and preferably several) of the multipath instances of the received signal must be performed before the symbols in the signal may be identified. In FIG. 1, the start of the acquisition period is indicated by point B.

Digital wireless signals are usually encoded for various reasons (e.g., error correction, redundancy introduction and dispersal, encryption, etc.), and the received signals must therefore be decoded before interpretation may begin. Some of the circuits or algorithms used to decode these signals (such as Viterbi and other maximum likelihood decoders) should be initialized, typically with a preamble of received symbols, before they can begin to process data reliably. Once the acquisition process has completed and the receiver is ready to produce valid symbols, therefore, the decoder initialization period may begin (point C in FIG. 1).

At some subsequent moment, the mobile unit begins to receive the paging signal. This moment may occur as early as the start of the assigned paging slot (point D in FIG. 1), or it may be delayed depending, for example, on whether the base unit is occupied with other system activity. Eventually, the mobile unit will receive as much of the paging signal as it requires for proper interpretation, a moment indicated by point E in FIG. 1. It is possible for this moment to arrive before the entire paging signal is received, as the mobile unit only needs to interpret enough of the paging signal to know that no message is pending and may ignore the remainder. Possibly after a decoding delay, then, the interpretation of this portion of the paging signal will be completed (point F in FIG. 1).

In anticipation that no incoming message will be reported, it is possible to power down the RF circuitry (which event is indicated as point G in FIG. 1) as early as point E. Usually, however, the RF circuitry will be kept in a powered state until after point F (as shown in FIG. 1), in case interpretation of the paging signal should indicate that a response is required. In order to facilitate system synchronization, it may also be desirable to power the RF circuitry up or down only at moments having a substantially predetermined relation to a system reference time such as the slot boundary.

Existing cellular telephone systems that use the technique of slotted paging include those operating under the GSM and IS-95 standards. The parameters that define slotted paging under the IS-95 standard, for example, are presented in section 6.6.2.1.1 of TR45 Mobile Station-Base Station Compatibility Standard for Dual-Mode Wideband Spread Spectrum Cellular Systems (TIA/EIA/SP-3693 [to be published as TIA/EIA-95], TIA [Telecommunications Industry Association], Arlington, Va., 1997). Discontinuous reception in the GSM system is described in GSM Technical Specification 03.13 (version 5.0.0, March 1996, European Telecommunications Standards Institute [ETSI], 06921 Sophia Antipolis Cedex France).

Under the IS-95 standard, the slots in the paging channel are numbered from 0 to 2047 and each paging slot has a duration of 80 ms. A mobile unit has a slot number and a slot cycle index, and the number of slots n between the start of adjacent assigned slots may be expressed as a function of the slot cycle index i as $$n=16\times 2^i,$$

where i is a nonnegative integer. For a mobile unit having a slot cycle index of 0, for example, the starting times of each adjacent pair of assigned slots are separated by 16 slots (i.e. 1.28 seconds). Therefore, a mobile unit having a slot cycle index of 0 and the slot number 3 would be assigned to slots 3,19, 35, and so on up to slots 2019 and 2035.

For slot cycle indices of 1, 2, and 3, the respective periods of separation between the starting times of each adjacent pair of assigned slots are 32, 64, and 128 slots (or 2.56, 5.12, and 10.24 seconds). In North America, cellular telephones typically operate at slot cycle indices of 1, while a slot cycle index of 2 is more common for cellular telephones in Japan. The slot cycle index is a variable quantity, however, and it is also common for a cellular telephone to operate at slot cycle index 0 upon power-up until a good estimate of the relation between local and system oscillator frequencies is obtained. For another type of mobile unit, such as a remote data terminal, operation at a larger slot cycle index may be more appropriate; the IS-95 standard does not include an upper limit on the value of the slot cycle index.

Handoff Negotiation

At any one time, a mobile unit is usually connected to the system mainly through at least one particular base unit (i.e. the 'home' base unit). Eventually, the mobile unit will travel beyond the range of the home base unit or will otherwise become unable to receive signals from this base unit any longer (e.g. because of signal path obstructions), and it win be necessary to establish a system connection (or to upgrade an existing system connection) between the mobile unit and another base unit (i.e. a new home base unit). It is desirable for a mobile unit to maintain a continuous connection with the system, thereby avoiding the necessity of rexecuting costly connection and authentication routines every time the mobile unit becomes connected to a different base unit. In order to allow the existing connection to continue, the system will typically negotiate a 'handoff' of the connection from the old home base unit to the new home base unit.

Typically, the mobile unit will actively participate in handoff negotiations by monitoring the power of signals received from several base units in its vicinity, thereby obtaining information needed to choose the most appropriate new home base unit. Note that such active participation must continue even during standby mode if the mobile unit is to continue to receive paging signals. Therefore, a mobile unit in standby mode must not only receive and process paging signals, but it must also monitor the strengths of signals of nearby base units. It is desirable for the mobile unit to coordinate and overlap these two functions in order to minimize the period during which the RF circuitry is powered (hereinafter referred to as the 'RF power period').

Pilot Monitoring

In order to provide a power reference for the mobile units monitoring its signal, each base unit in a wireless telephone system will typically broadcast a substantially continuous beacon signal on some frequency, time, and/or code channel. In a system operating under the IS-95 standard, for example, the beacon signal is a pilot signal that may also serve as a phase reference for coherent demodulation of the paging signal. Typically, all of the various pilot signals will arrive on the same frequency channel as the paging channel, so that pilot and paging information may be extracted from the same received signal by applying the respective spreading and/or covering codes. Even in systems operating under the IS-95 standard, however, it is possible that one or more of the pilot signals will be transmitted on a different frequency channel, thus requiring the mobile unit to perform its monitoring tasks on more than one frequency channel.

In an IS-95 system, all of the pilot signals are spread by the same pseudonoise (PN) code. This code has a period of 32,768 chips (i.e. code symbols), and each pilot is distinguished from any other that may appear within its range by a unique offset that indicates the code starting point for the particular pilot. Five hundred twelve different offsets are defined, each being spaced at an interval of 64 chips from the two closest other offsets. The home base station supplies a list of offsets (i.e. the neighbor list) to the mobile unit for monitoring, wherein these offsets define the pilot signals of the neighbor base stations. Under the IS-95 standard referenced above (also called IS-95A), the neighbor list has 20 entries, while the list has 40 entries under the IS-95B revision (as defined, for example, in TIA/EIA-95B, "Mobile Station-Base Station Compatibility Standard for Dual-Mode Spread Spectrum Systems," SP-3693-1 published by TIA [Telecommunications Industry Association] March, 1999, Arlington, Va.). Although no maximum time between evaluations of each pilot is specified in the standard, as a matter of practice the mobile must reevaluate the strength of each pilot on the list within a short period of time or risk losing its connection to the system.

Clearly, the mobile unit has a significant amount of work to do in 'standby mode.' Much of this work depends on information gained via the RF circuitry, and the mobile's task is therefore complicated by the desirability of reducing power consumption by minimizing the RF power period.

Searching and Search Result Processing

In order to monitor the active pilot (i.e. the pilot transmitted by the home base station) and the neighbor pilots (i.e. the pilots transmitted by the neighbor base stations), a mobile unit in an IS-95 system will have at least one searcher for detecting these pilots and measuring such parameters as signal strength and time of arrival. Searching for a particular pilot is typically done by correlating the received signal with the pilot PN code as shifted by (1) the particular pilot's known offset and (2) a series of smaller offsets to account for multipath delay effects. Parameters that may be used to define the search include the PN offset number, the number of lags in the correlation window, and a reference point from which the location of the zero lag position may be identified. Other parameters include the coherent and non-coherent integration lengths, which determine respectively the length of the window over which each correlation is performed and the number of consecutive windows whose correlation results are combined to obtain a single result. The search results may be processed, for example, to determine the received pilot's relative strength as compared to other received pilots and to adjust the parameters for the next search of this pilot.

Available circuit area in a mobile unit is typically extremely limited, and a mobile unit will usually have only one processing unit. FIG. 2 shows a functional diagram of a system for receiving paging information and performing pilot monitoring in which the paging and pilot signals are recovered from the same digital data signal as outputted by A/D converter 120. Power to RF stage 110 is controlled by RF power control 160 (which may be, e.g., a regulator with an enable terminal) in response to a command from processing unit 150 or possibly from another timing unit.

In order to avoid the need to extend the period during which RF stage 110 is powered (i.e. the RF power period), processing unit 150 performs two separate tasks in this period. One task is to supply parameters to the searcher 130 for conducting active searches (i.e. searches for the active pilot) and neighbor searches (i.e. searches for the neighbor pilots) and receive and process search results from searcher 130. The other task which processing unit 150 performs in this period is to control paging signal decoder 140 and interpret the paging message it outputs. Data memory 170 may be used for intermediate storage of search parameters and/or search results.

FIG. 3 is a flowchart showing a sequence of subtasks performed within the monitoring task by such a system, and FIG. 4 shows a timeline corresponding to FIG. 3 which displays a representative sequence of execution of the subtasks 210–240, where the subtasks are labeled as in FIG. 3. The period shown in FIG. 4 begins at a moment subsequent to the start of the acquisition period (point X being subsequent to point B in FIG. 1) and ends at the moment when the necessary paging information is interpreted (point F as in FIG. 1).

Note that processing unit 150 performs the monitoring task during this period only to reduce power consumption, and that it is possible to perform monitoring at any other time at the cost of powering the RF circuitry. On the other hand, it is essential for processing unit 150 to perform the paging task at this time, because the paging signal is not available at any other time. If the processing unit becomes too overloaded during this period to perform the paging task because of the additional processing required for the monitoring task, the mobile unit will be unable to detect an incoming page. Therefore it may be necessary to restrain the monitoring task by imposing a limit on the number of searches and/or the rate at which searches may be performed during this period. Such restriction is called 'search throttling.'

Because the length of the RE power period must be limited to conserve battery power, the amount of time available to program and process searches is also limited. As the active pilot must be searched frequently in order to support the current link, the number of neighbors that may be searched in the time remaining in the RF power period corresponding to any particular assigned paging slot is therefore typically limited to less than half a dozen. A major consequence of this limitation is an incomplete state of knowledge within the system of the mobile unit's environment, which leads to poorer idle handoff performance and a requirement for longer and more frequent rehabilitative procedures to refresh the knowledge base. For example, when the quality of the knowledge of the environment drops below a predetermined level, the mobile unit will typically be required to enter a 'link maintenance' condition, wherein it must keep the RF circuitry powered long enough to perform a new search for every neighbor on the list. Because link maintenance procedures increase power consumption significantly by extending the RF power period, it is desirable to reduce the number of times such procedures are required.

SUMMARY OF THE INVENTION

A novel method and apparatus is disclosed in which processing of some or all of the pilot search results is deferred until the RF power period has ended or until the searching process is otherwise terminated. Because the processing unit is for the most part unloaded and otherwise inactive at this time, it becomes unnecessary to restrict the number of searches performed during the RF power period. The freedom to perform more searches allows the mobile unit to obtain a more comprehensive picture of the status of the environment, which in turn enables superior idle handoff performance, without incurring the power cost of extending the RF power period. Time spent performing link maintenance is also reduced, thereby reducing power consumption and increasing battery charge life.

BRIEF DESCRIPTION OF THE DRAWINGS

FIG. 10 is a flowchart showing an algorithm for a system for pilot monitoring according to an alternative embodiment of the invention.

DETAILED DESCRIPTION OF THE INVENTION

Figure 5:
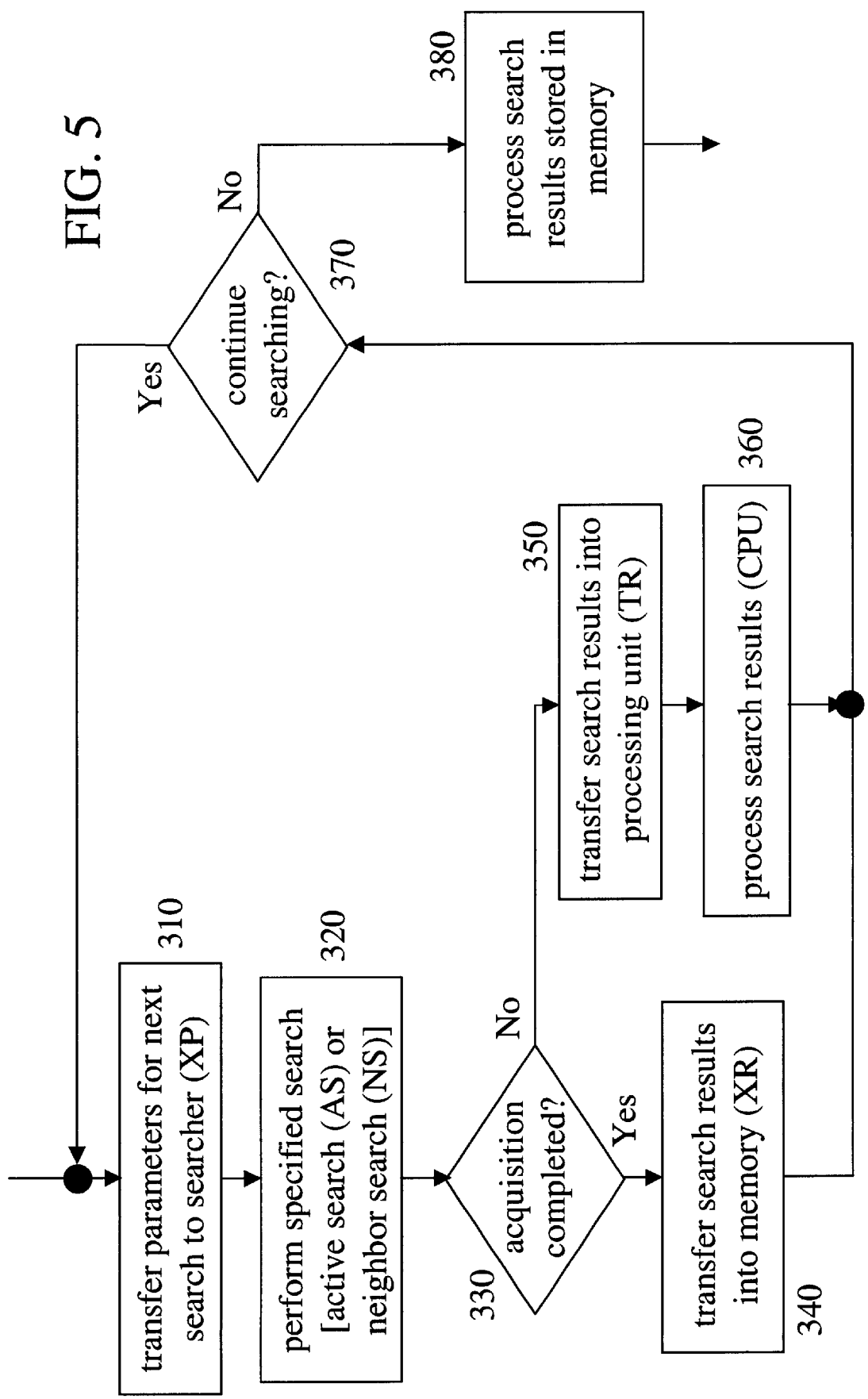
FIG. 5 is a flowchart showing an algorithm for a system for pilot monitoring according to a first embodiment of the invention.

In the flowchart of FIG. 5, an algorithm for a system according to a first embodiment of the invention is shown. In this algorithm, processing of the search results (subtask 380) is deferred until the RF power period has ended or searching has otherwise been terminated (for example, because the RF power period will expire before another search can be completed).

Figure 4:
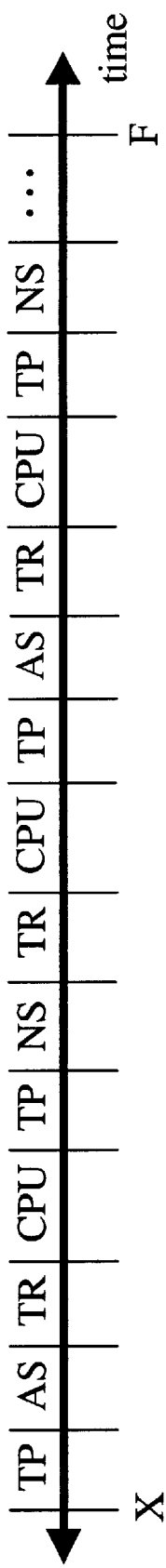
FIG. 4 shows a timeline for a system implementing the algorithm shown in FIG. 3.
Figure 6A:
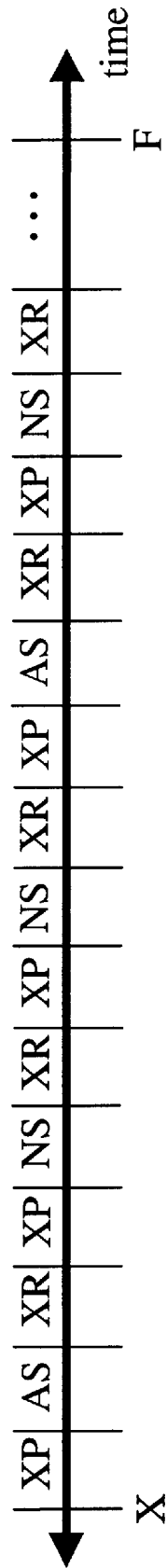
FIG. 6A shows a timeline for a system implementing the algorithm shown in FIG. 5.

FIG. 6A shows a timeline corresponding to FIG. 5 which displays a representative sequence of execution of the subtasks 310,320, and 340, where the subtasks are labeled as in FIG. 5. The period shown in FIG. 6A begins at a moment subsequent to the start of the acquisition period (point X being subsequent to point B in FIG. 1) and ends at the moment when the necessary paging information is interpreted (point F as in FIG. 1). Note that the sequence of subtasks 310–340 will typically continue to execute beyond point F and may continue on to point G. Although the duration of each subtask is not necessarily drawn to scale, by comparing FIG. 6A to FIG. 4 one may see how an algorithm according to the first embodiment of the invention defers the processing subtask to occur after point F and how this feature allows the rate of neighbor searches (NS) to be significantly increased.

Figure 1:
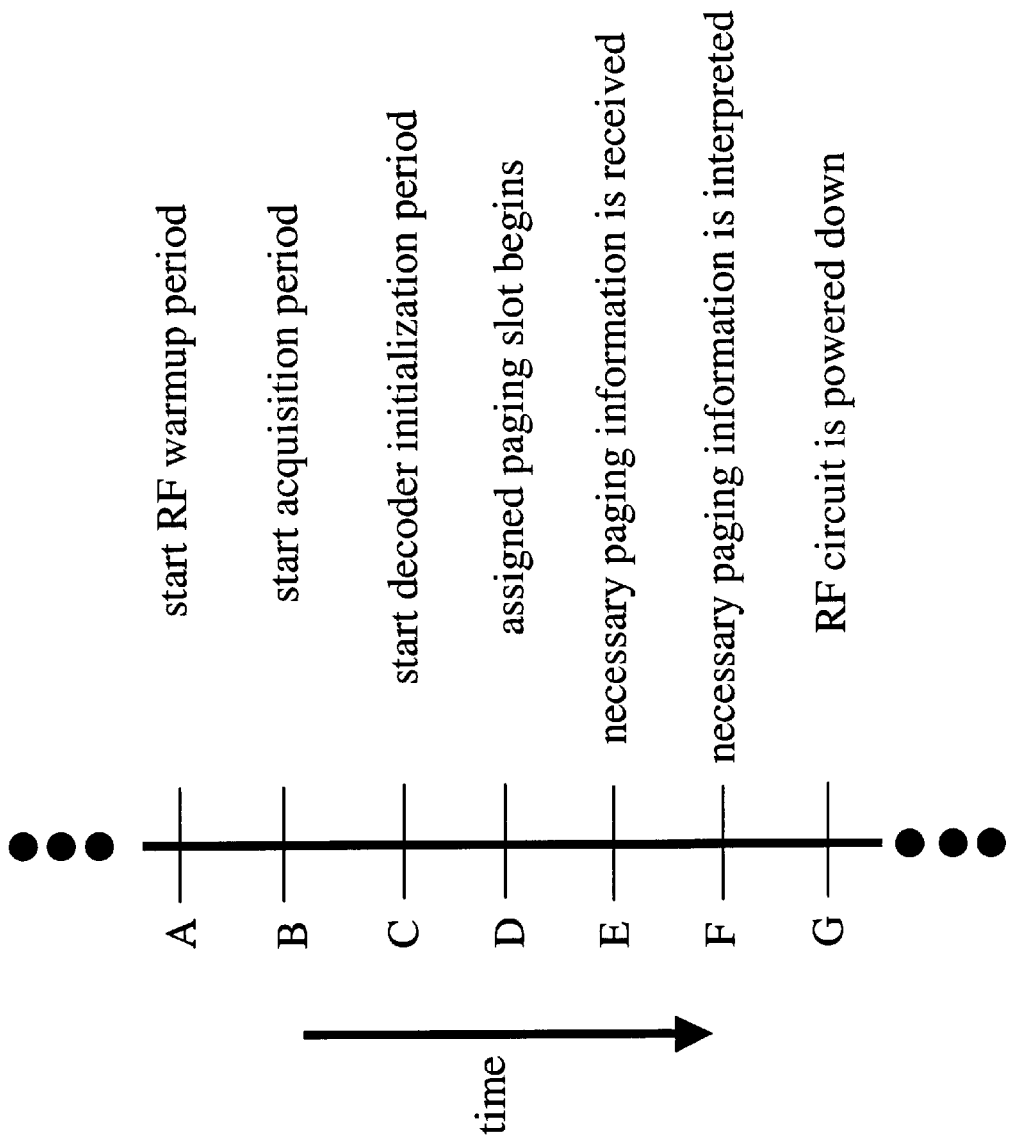
FIG. 1 shows a timeline indicating several events in a system using slotted paging.
Figure 2:
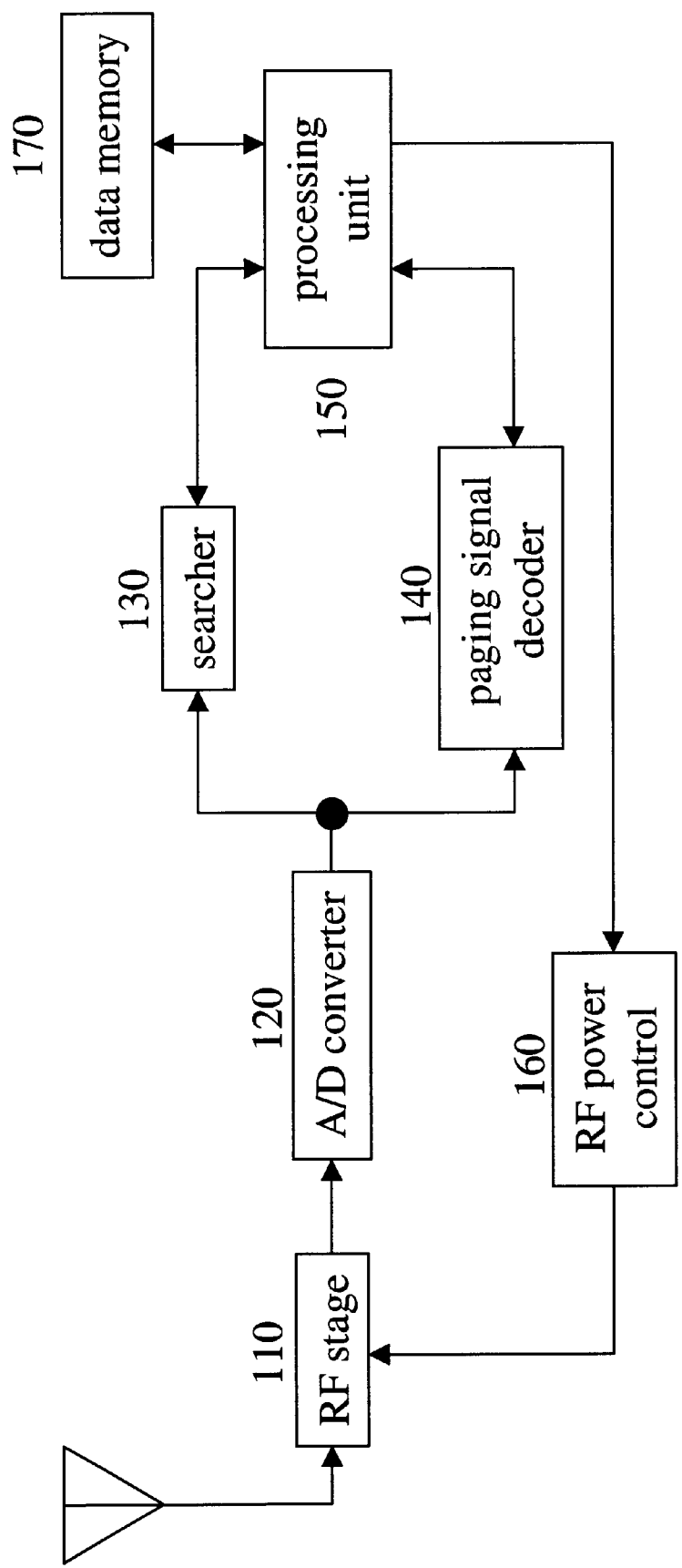
FIG. 2 shows a functional block diagram of a system in a mobile unit for wireless communications for supporting paging signal processing and pilot monitoring.
Figure 6B:
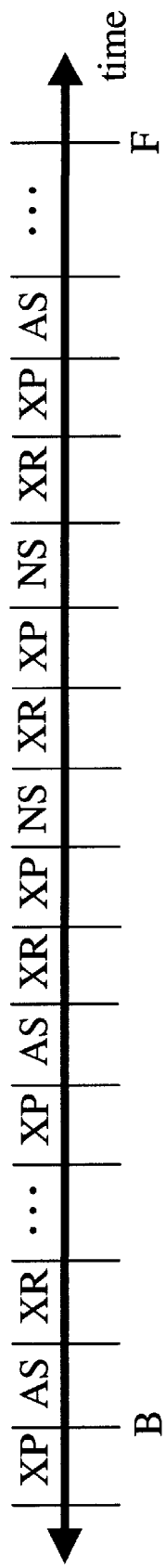
FIG. 6B shows another timeline for a system implementing the algorithm shown in FIG. 5.

As shown in FIG. 6B (wherein point B indicates the start of the acquisition period as in FIG. 1 and which figure is otherwise similar to FIG. 6A), it is also possible to gain a slight headstart in the acquisition process by preloading the first set of search parameters (i.e. performing transfer subtask 310 in FIG. 5) into searcher 130 of FIG. 2 so that active search subtask 320 in FIG. 5 may begin as soon as the RF circuitry is stabilized.

In this novel system, processing unit 150 as shown in FIG. 2 is required to perform only a limited amount of processing at the start of the RF power period. After acquisition is completed, the monitoring task only requires processing unit 150 to perform a transfer of parameters to the searcher for the next search and a subsequent transfer of search results from the searcher to memory 170 for storage. Because the load on processing unit 150 is thus significantly reduced, there is no danger of overloading the processor with search processing and therefore no need for search throttling, and use of the RF power period may be maximized.

Processing unit overhead is also reduced in the new system because context switching may be eliminated. For a task of any complexity, processing unit 150 will often save temporary values in its local memory (e.g. a set of registers or accumulators or a cache, such temporary values being collectively referred to as a context) to facilitate performance of the task. It is common for a processing unit in a system to execute several such tasks concurrently, switching from one ongoing task to another, instead of beginning a new task only when the previous one has been completed. When it becomes necessary for processing unit 150 to switch from one task to another, the context associated with the current task must be moved (i.e. switched) to another area of memory so that it may be recalled when the task is resumed, and so that in the meantime the local memory of processing unit 150 may be overwritten with the context of the new task. Context switches are time-consuming because a large number of clock cycles is typically required to move the values of a context from one portion of the memory to another. Moreover, processing unit 150 performs no useful work in a context switch and is in fact prevented from performing useful work for the duration of a context switch.

Figure 3:
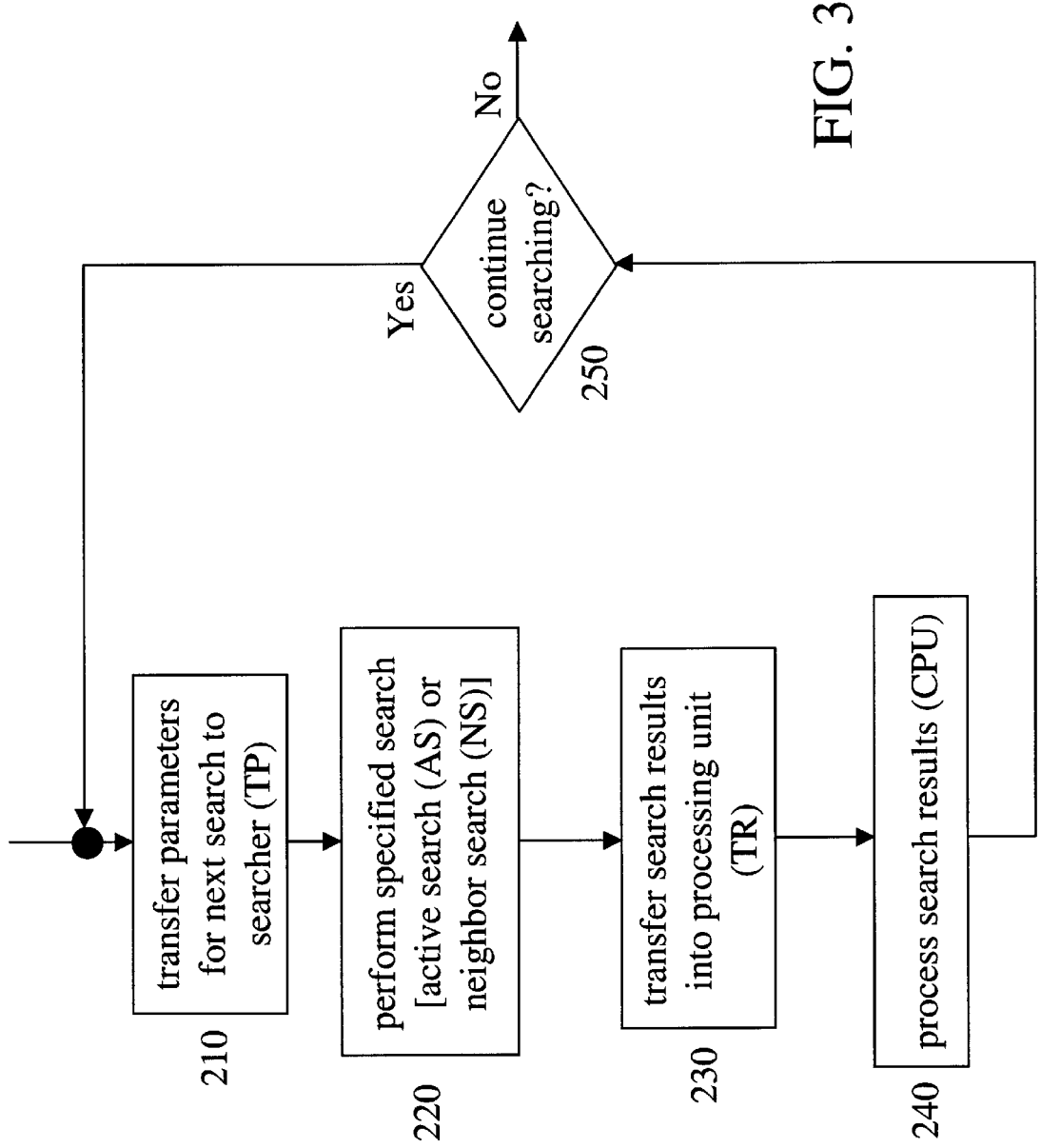
FIG. 3 is a flowchart showing an algorithm for implementing pilot monitoring.

In a system as in FIG. 2 operating according to the algorithm of FIG. 3, processing unit 150 must typically perform a context switch every time it switches from the paging task to the processing subtask of the monitoring task (subtask 240). In a system as in FIG. 2 operating according to the novel algorithm of FIG. 5, however, once acquisition has been performed, no such processing is required by the monitoring task before the paging task has completed, so no context switches are required. As for the transfer subtask 310 and the storage subtask 340, processing unit 150 may perform them within an interrupt routine, wherein the processing unit is directed to perform a different set of instructions temporarily but the context need not be not disturbed.

Figure 7:
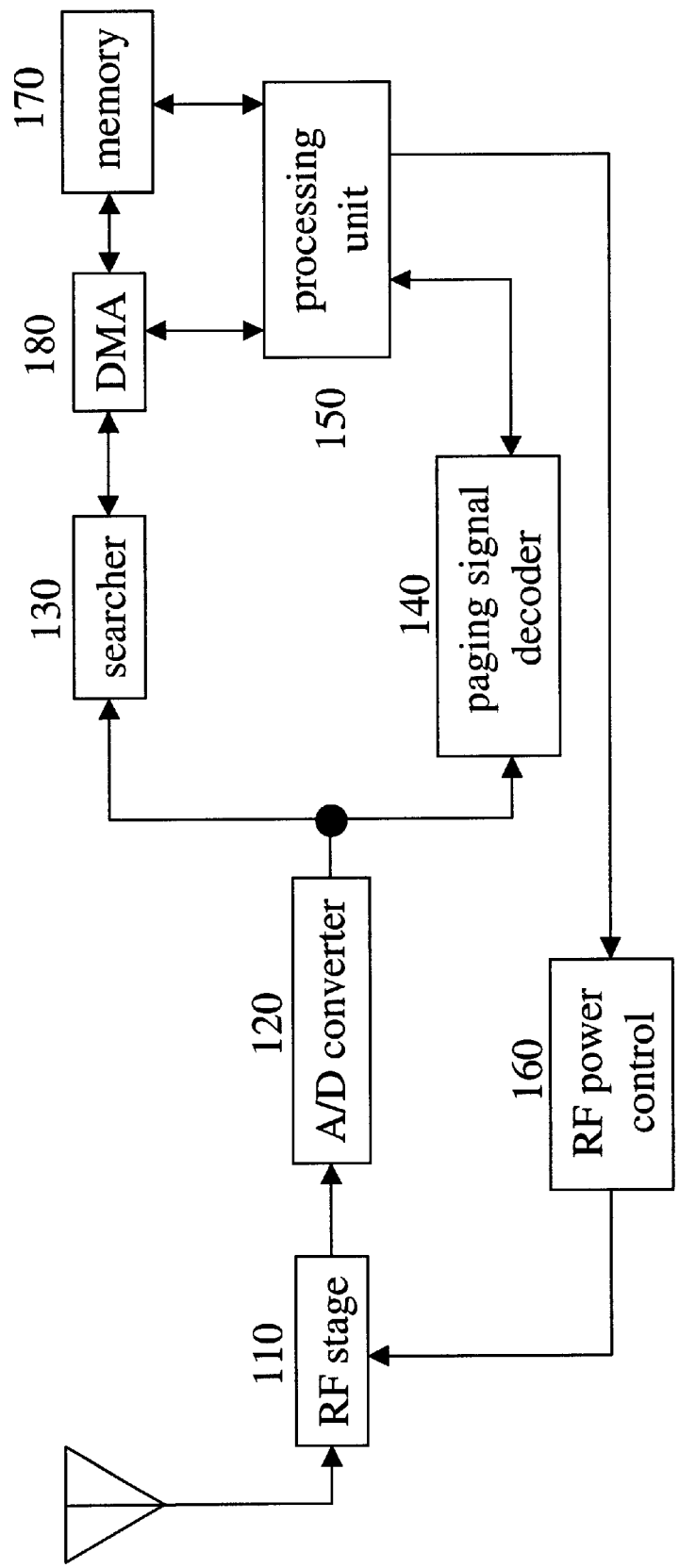
FIG. 7 shows a functional block diagram of a system in a mobile unit for wireless communications for supporting paging signal processing and pilot monitoring which incorporates a direct memory access (DMA) controller.
Figure 8:
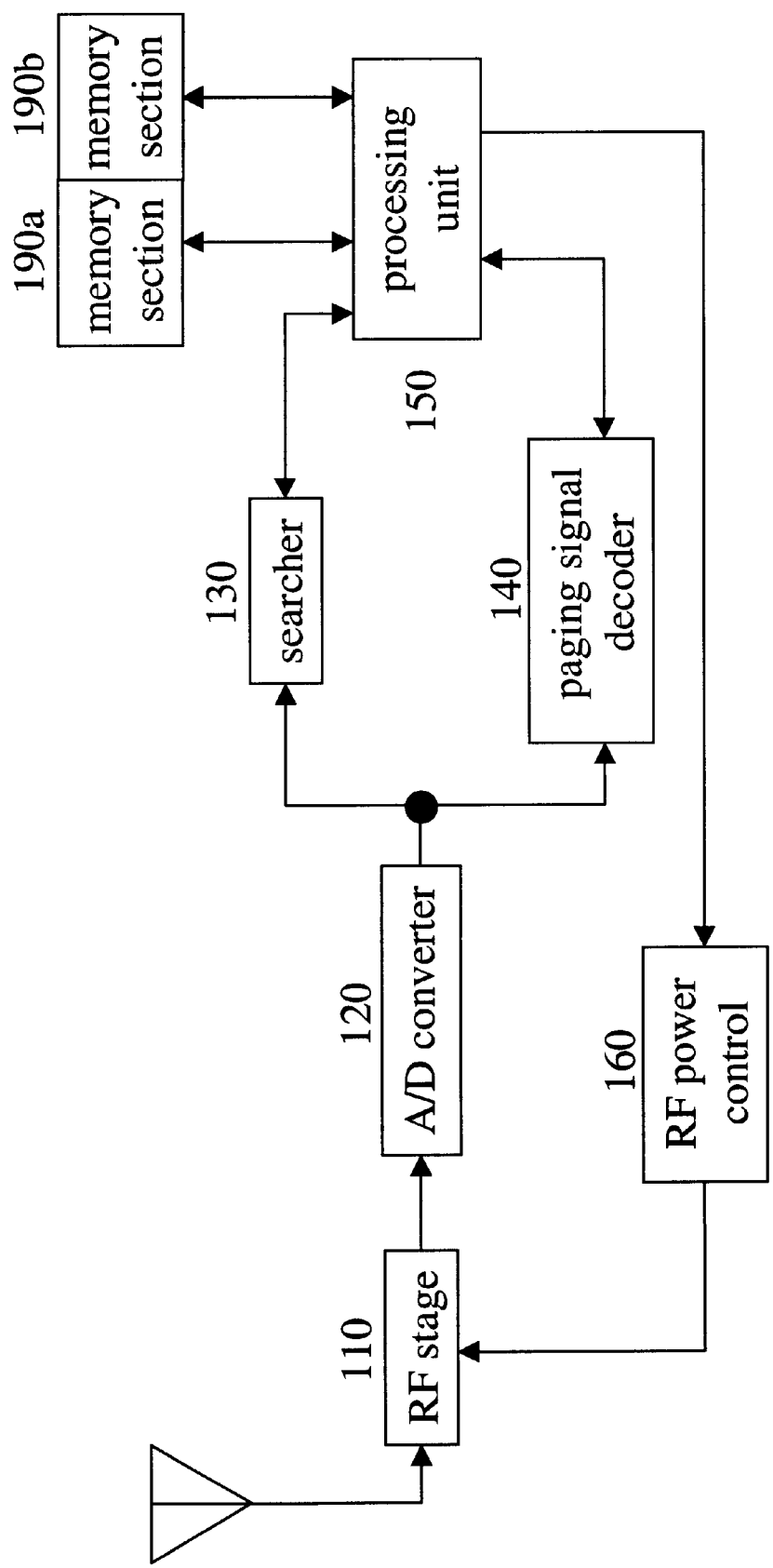
FIG. 8 shows a functional block diagram of a system in a mobile unit for wireless communications for supporting paging signal processing and pilot monitoring which has two data memory sections.
Figure 9:
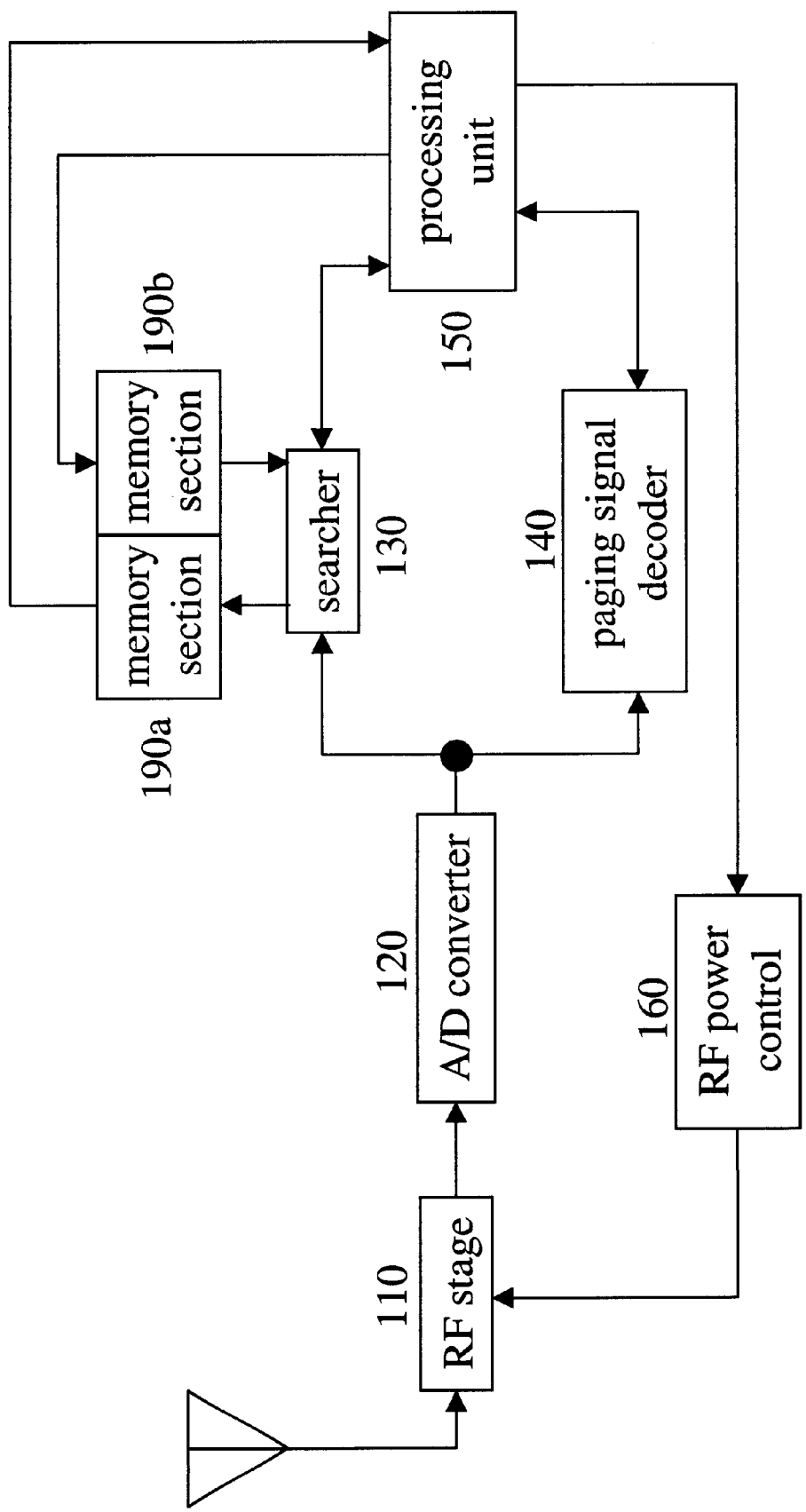
FIG. 9 shows a functional block diagram of an alternative system in a mobile unit for wireless communications for supporting paging signal processing and pilot monitoring which has two data memory sections.

Although the approach described above greatly reduces the use of processing unit 150 by the monitoring task, it is in fact possible to further reduce the load on processing unit 150 by using a direct memory access (DMA) controller 180 as shown in FIG. 7 to transfer data directly between the searcher and memory without passing through processing unit 150 (i.e. to perform transfer subtask 310 and storage subtask 340). Furthermore, it is even possible to perform subtasks 310 and 340 at substantially the same time by providing separate memory busses for the portion of the memory storing the search parameters and the portion storing the search results as shown in FIG. 8, thereby increasing the portion of the RF power period during which the searcher is available to perform searches. In this case, a data memory having two sections 190a and 190b may be used as shown in FIG. 8. Each section of this data memory may comprise a physically separate unit, or a different portion of a single unit may be used for each of the sections 190a and 190b, so long as the memory can handle two access requests at the same time or logic is otherwise provided to deal with access request contentions. An alternative embodiment is shown in FIG. 9, wherein the search parameters and results are transferred directly between searcher 130 and memory sections 190a and 190b, respectively, without passing through processing unit 150.

Deferring the processing of the search results also allows the searcher to function free of two major constraints: (1) the restriction of search throttling and (2) the need to wait for processing unit 150 to finish processing the results of the previous search before the parameters for the next search can be obtained. In the novel system, factors limiting the number of searches that may be performed within the RF power period include search window size and depth and any processing unit overhead incurred in transferring values to and from searcher 130 and memory 170.

Deferring processing of the results of neighbor pilot searches will typically have no effect on system performance, as it would be unusual for the same neighbor to be searched twice in the same RF power period. If processing unit capacity is available, however, it may be desired to continue to process the results of active pilot searches during the RF power period, as it may be possible to reduce search window size (and thus perform more searches) by applying information such as multipath delay time that has been obtained from the results of a very recent search. Alternatively, available processing capacity may be used to process the results of active and/or neighbor pilot searches in order to decrease the amount of processing to be performed after the RF power period has ended.

By deferring processing and letting searcher 130 run at full speed, the invention optimizes the use of the RF power period. In some systems, however, it is possible that processing unit 150 would otherwise be powered down during the idle slots and that applying the invention would therefore seem to increase overall power consumption. However, processing unit 150 typically takes very little power (about 1 mA), and the superior searching performance provided by the invention can be expected to allow the system to substantially reduce the number of times a link maintenance procedure must be executed. Thus, even in a system where processing unit 150 would otherwise be powered down during the idle slots, the power saved by applying the invention and thereby avoiding link maintenance conditions may be expected to offset the power cost incurred by keeping processing unit 150 on after the RF power period has expired.

The foregoing description of the preferred embodiments is provided to enable any person skilled in the art to make or use the present invention. Various modifications to these embodiments will be readily apparent to those skilled in the art, and the generic principles presented herein may be applied to other embodiments without use of the inventive faculty. For example, one of ordinary skill in the art will appreciate that the novel techniques disclosed herein may also be practiced according to the algorithm shown in the flowchart of FIG. 10, wherein steps 410 through 440 comprise the acquisition subprocess and a test analogous to step 330 in FIG. 5 is no longer required.

The invention may be implemented in part or in whole as a hard-wired circuit, as a circuit configuration fabricated into an integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

I claim:

1. A method comprising:
   receiving a radio signal and outputting a digital data signal, the digital data signal comprising a plurality of pilot signals, said receiving being performed while a RF stage is in a powered state;
   deriving a plurality of search results in a consecutive order, each of the plurality of search results being derived from the digital data signal; and
   processing the plurality of search results,
   wherein deriving the plurality of search results is performed while the RF stage is in the powered state and processing the plurality of search results is performed while the RE stage is in an unpowered state.

2. The method according to claim 1, said method further comprising transferring a plurality of search parameters from a data memory directly to a searcher for deriving the plurality of search results, the plurality of search parameters including a plurality of code offsets, each of the plurality of code offsets corresponding to one of the pilot signals,
   wherein deriving the plurality of search results occurs according to the plurality of search parameters.

3. The method according to claim 1, said method further comprising transferring the plurality of search results into a data memory;
   wherein transferring the plurality of search results occurs before processing the plurality of search results.

4. The method according to claim 1, said method further comprising:
   transferring a plurality of search parameters from a data memory directly to a searcher for deriving the plurality of search results, the plurality of search parameters including a plurality of code offsets, each of the plurality of code offsets corresponding to one of the pilot signals; and
   transferring the plurality of search results into a data memory,
   wherein deriving the plurality of search results occurs according to the plurality of search parameters, and
   wherein transferring the plurality of search results occurs before processing the plurality of search results.

5. The method according to claim 4, wherein at least one among transferring the plurality of search parameters and transferring the plurality of search results is controlled by a direct memory access controller.

6. The method according to claim 4, wherein each of the plurality of search results comprises a measure of a strength of the corresponding one of the pilot signals.

7. The method according to claim 6, wherein at least one among transferring the plurality of search parameters and transferring the plurality of search results is controlled by a direct memory access controller.

8. A method comprising:
   receiving a radio signal and outputting a digital data signal, the digital data signal comprising a plurality of pilot signals, said receiving being performed while a RF stage is in a powered state;
   receiving the digital data signal and outputting a plurality of search results in a consecutive order, each of the plurality of search results corresponding to one of the plurality of pilot signals; and
   processing the plurality of search results,
   wherein said processing of a first one of the plurality of search results occurs at a time when the RF stage is in an unpowered state, said first one being earlier in said consecutive order than another among the plurality of search results.

9. The method according to claim 8, said method further comprising transferring a plurality of search parameters from a data memory directly to a searcher for deriving the plurality of search results, the plurality of search parameters including a plurality of code offsets, each of the plurality of code offsets corresponding to one of the pilot signals,
   wherein deriving the plurality of search results occurs according to the plurality of search parameters.

10. The method according to claim 8, said method further comprising transferring the plurality of search results into a data memory;
    wherein transferring the plurality of search results occurs before processing the plurality of search results.

11. The method according to claim 8, said method further comprising:
    transferring a plurality of search parameters from a data memory directly to a searcher for deriving the plurality of search results, the plurality of search parameters including a plurality of code offsets, each of the plurality of code offsets corresponding to one of the pilot signals; and
    transferring the plurality of search results into the data memory,
    wherein deriving the plurality of search results occurs according to the plurality of search parameters, and
    wherein transferring the plurality of search results occurs before processing the plurality of search results.

12. The method according to claim 11, wherein at least one among transferring the plurality of search parameters and transferring the plurality of search results is controlled by a direct memory access controller.

13. The method according to claim 11, wherein each of the plurality of search results comprises a measure of a strength of the corresponding one of the pilot signals.

14. The method according to claim 13, wherein at least one among transferring the plurality of search parameters and transferring the plurality of search results is controlled by a direct memory access controller.

15. An apparatus comprising:
    a receiving unit for receiving a radio signal and outputting a digital data signal, the digital data signal comprising a plurality of pilot signals, a RF stage of said receiving unit having a powered state and an unpowered state;
    a searcher for outputting a plurality of search results in a consecutive order, each of the plurality of search results being derived from the digital data signal; and
    a processing unit for receiving and processing the plurality of search results,
    wherein the searcher outputs the plurality of search results at a time when said RF stage of said receiving unit is in the powered state and said processing unit processes the plurality of search results when said RF stage of said receiving unit is in the unpowered state.

16. The apparatus according to claim 15, said apparatus further comprising:

a data memory for receiving a plurality of search parameters from said processing unit, wherein said searcher derives the plurality of search results according to the plurality of search parameters, the plurality of search parameters including a plurality of code offsets, each of the plurality of code offsets corresponding to one of the pilot signals.

17. The apparatus according to claim 15, said apparatus further comprising:

a data memory for storing the plurality of search results, wherein storing the plurality of search results occurs before receiving and processing the plurality of search results.

18. The apparatus according to claim 15, said apparatus further comprising:

a data memory for receiving a plurality of search parameters from said processing unit and for storing the plurality of search results, wherein said searcher derives the plurality of search results according to the plurality of search parameters, the plurality of search parameters including a plurality of code offsets, each of the plurality of code offsets corresponding to one of the pilot signals, and wherein storing the plurality of search results occurs before receiving and processing the plurality of search results.

19. The apparatus according to claim 18, wherein at least one among receiving the plurality of search parameters and storing the plurality of search results is controlled by a direct memory access controller.

20. The apparatus according to claim 18, wherein each of the plurality of search results comprises a measure of a strength of the corresponding one of the pilot signals.

21. The apparatus according to claim 20, wherein at least one among receiving the plurality of search parameters and storing the plurality of search results is controlled by a direct memory access controller.

22. An apparatus comprising:

a receiving unit for receiving a radio signal and outputting a digital data signal, the digital data signal comprising a plurality of pilot signals, a RF stage of said receiving unit having a powered state and an unpowered state;

a searcher for receiving the digital data signal and outputting a plurality of search results in a consecutive order, each of the plurality of search results corresponding to one of the plurality of pilot signals; and a processing unit for processing the plurality of search results, wherein said processing unit processes a first one of the plurality of search results at a time when said RF stage of said receiving unit is in the unpowered state, said first one being earlier in said consecutive order than another among the plurality of search results.

23. The apparatus according to claim 22, said apparatus further comprising:

a data memory for receiving a plurality of search parameters from said processing unit, wherein said searcher derives the plurality of search results according to the plurality of search parameters, the plurality of search parameters including a plurality of code offsets, each of the plurality of code offsets corresponding to one of the pilot signals.

24. The apparatus according to claim 22, said apparatus further comprising:

a data memory for storing the plurality of search results, wherein storing the plurality of search results occurs before receiving and processing the plurality of search results.

25. The apparatus according to claim 22, said apparatus further comprising:

a data memory for receiving a plurality of search parameters from said processing unit and for storing the plurality of search results, wherein said searcher derives the plurality of search results according to the plurality of search parameters, the plurality of search parameters including a plurality of code offsets, each of the plurality of code offsets corresponding to one of the pilot signals, and wherein storing the plurality of search results occurs before receiving and processing the plurality of search results.

26. The apparatus according to claim 25, wherein at least one among receiving the plurality of search parameters and storing the plurality of search results is controlled by a direct memory access controller.

27. The apparatus according to claim 25, wherein each of the plurality of search results comprises a measure of a strength of the corresponding one of the pilot signals.

28. The apparatus according to claim 27, wherein at least one among receiving the plurality of search parameters and storing the plurality of search results is controlled by a direct memory access controller.

* * * * *